United States Patent [19]

Hodgson et al.

[11] 4,110,356

[45] Aug. 29, 1978

[54] RECOVERY OF DOMESTIC OIL FROM SPENT CLAY

[75] Inventors: Allan S. Hodgson, Berea; Jerry F. P. Red, Cleveland, both of Ohio

[73] Assignee: SCM Corporation, New York, N.Y.

[21] Appl. No.: 831,958

[22] Filed: Sep. 9, 1977

[51] Int. Cl.² ............................................. C11B 13/04
[52] U.S. Cl. .................................................. 260/412.5
[58] Field of Search ...................... 252/412; 260/412.5

[56] References Cited

U.S. PATENT DOCUMENTS

| 1,828,035 | 10/1931 | Ellis | 260/412.5 |
| 2,236,679 | 4/1941 | Ferguson et al. | 252/413 |
| 4,049,685 | 9/1977 | Smith et al. | 260/412.5 |

Primary Examiner—P. E. Konopka
Attorney, Agent, or Firm—Richard H. Thomas

[57] ABSTRACT

Spent clay from the bleaching of $C_{18+}$ domestic glyceride esters ("oils") is deoiled by slurrying such spent clay with aqueous alkali at a temperature of at least about 80° C. and a weight ratio of water to clay of about 2–6:1 at a high "pH window" for such oil recovery.

4 Claims, 1 Drawing Figure

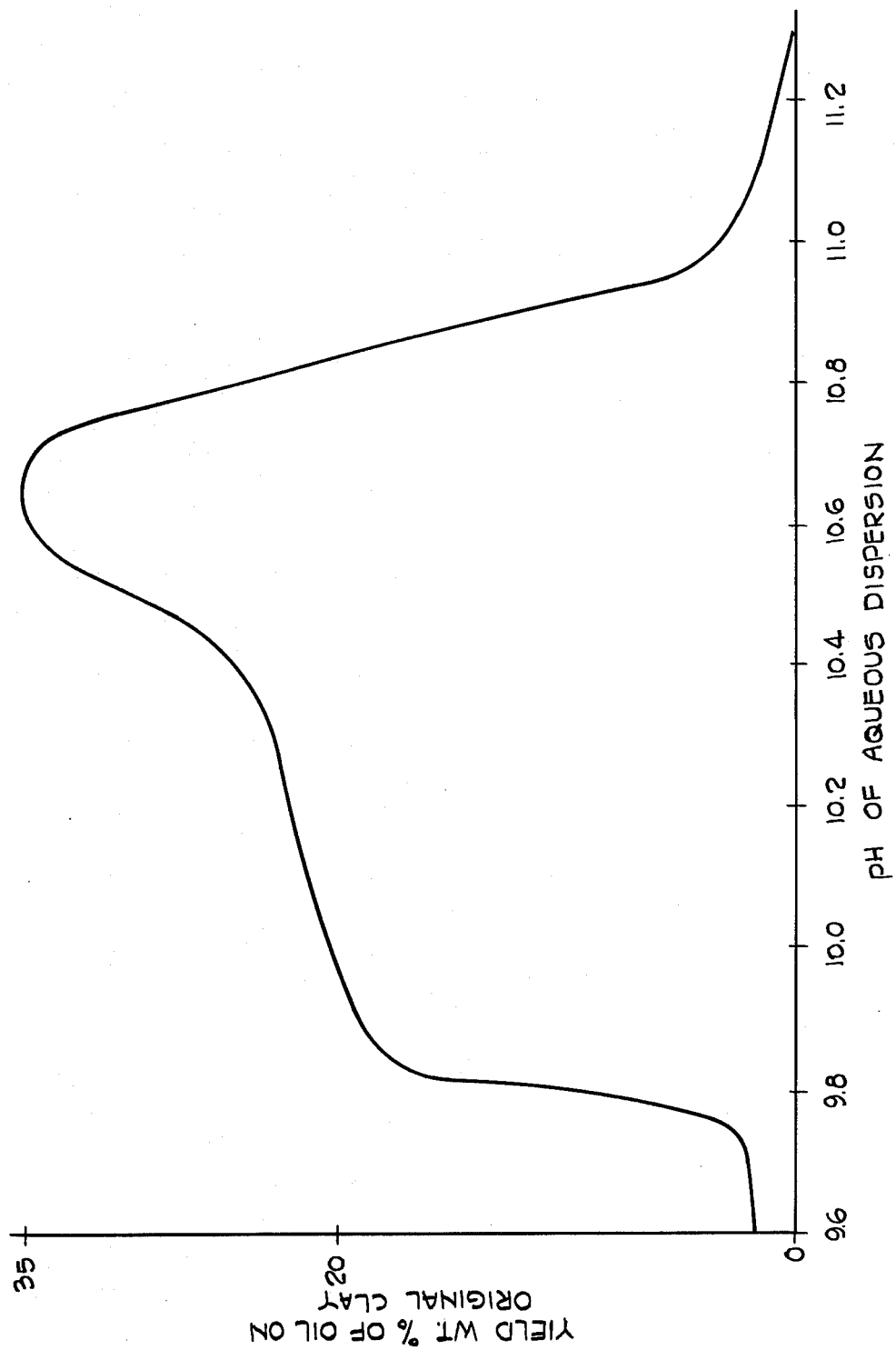

RECOVERY OF DOMESTIC OIL FROM SPENT CLAY

This invention relates to an improvement in process for cleansing domestic glyceride esters from the spent clay used for bleaching same, and more particularly to such process wherein such spent clay is contacted with aqueous alkali at elevated temperature.

BACKGROUND OF THE INVENTION

The bleaching of glyceride esters of fat-forming acids (collectively "oils" herein) often is done with a clay such as an acid clay. The clay becomes spent, i.e., substantially incapable of further economic sorption of color bodies or of other economic use. (Such clay also is used to bleach fatty acids or as a catalyst to assist in polymerizing unsaturated fatty acids to make "dimer" acids and higher polymers.) Frequently such spent clay is mixed with some activated carbon, and the presence of such activated carbon can be tolerated by the instant process.

Usually the spent clay is filtered from oils in the process of their refining, yielding a cake that often has about 20-55 % oil content (mainly glyceride esters) and the balance essentially clay solids. Disposal of such cake as landfill often conflicts with environmental considerations because of oily drainage and/or undesirable degradation or inflation of the oil present. Such perfunctory disposal can cost more than three dollars a cubic yard for hauling, and it also represents a waste of recoverable glyceride esters and/or fatty acids of fair value.

The desirability of recovering as esters various saponifiable oils (which are mostly glyceride esters) from spent bleaching clay has been evident for many years. The U.S. patent art reflects a variety of organic solvent extraction treatments and a variety of aqueous treatments for this purpose. The latter proposals include the use of various surface tension-reducing agents in the water to assist the oil separation or "washing" treatment of the spent clay, for example, added synthetic detergents, sodium aluminate, sodium stannate, sodium fluoride, water-soluble coagulant salts and added or in situ produced sodium soaps of fatty acids. The less pertinent art on the aqueous washing of spent clays is directed to substantially complete saponification of the oils with caustic soda or soda ash at temperatures approaching the atmospheric boiling point of water. The two heretofore patented proposals described below are believed to be the ones to be the most pertinent to the instant process.

U.S. Pat. No. 1,828,035 shows spent clay washing with aqueous saline solution containing caustic soda or caustic potash sufficient for neutralizing the free fatty acids present, but insufficient for saponifying any appreciable proportion of the glycerides present. Such saponification, it is stated, then would cause the emulsification of glycerides and create difficulty in separating same from the aqueous phase. Free fat-forming ("fatty") acids are completely neutralized at pH about 8. Sodium chloride is stated to be replaceable by sodium sulfate or other salts tending to repress emulsification of fatty oils in the aqueous liquid.

U.S. Pat. No. 2,706,201, to the extent it is directed to separating saponifiable oils from spent clay, shows adding sodium carbonate to a boiling mixture of clay and water "until a distinct alkalinity to phenolphthalein persists." Such pH indication starts at 8.3, although this would take a highly trained eye to notice it, and the red color is reasonably evident to most users by pH 9. In augmentation of this treatment the patent also suggests adding a synthetic detergent or soap. Many such saponifiable oils contain a very small proportion of free fatty acids; their neutralization to form sodium soaps under these conditions is unavoidable. The patent goes on to point out that where the required approximately 1% of soap cannot be formed in this way, it can be obtained by deliberately saponifying some of the ester with a bit of caustic soda.

While it is not absolutely clear from these references just how much of the glyceride esters present on the spent clay are recovered as glycerides, nor just how clean the clay becomes from such treatment, it should be fairly evident that some of the glyceride esters present are recoverable by such processing.

The instant invention is based on the discovery that for domestic glycerides a "pH window" exists as a rather sharply defined salient in the aqueous caustic washing of the spent clay, and additionally surprising, such salient is at a pH very much higher than previously taught or suggested by the art.

SUMMARY OF THE INVENTION

The instant invention is a process for treating crystalline clay that has been spent in the bleaching of domestic glyceride esters, said process comprising:

forming a dispersion of said spent clay and aqueous alkali, the temperature of said dispersion being at least about 80° C., the weight ratio of water to original spent clay in said dispersion being about 2–6:1, the pH of said dispersion being at about the salient for removal of glyceride ester as such from said spent clay; and recovering resulting separated glyceride ester from said dispersion.

THE DRAWINGS

The drawing is a plot of data from the first 6 Examples demonstrating graphically a surprising salient or narrow "pH window" which is exploited by this invention. The plot will be more fully described in connection with the Examples.

DETAILED DESCRIPTION

Lauric oils are those whose carboxylic acids (fat-forming acids) preponderate in lauric acid with minor proportions of other acids such as myristic acid. Typically lauric fats are coconut oil and palm kernel oil. By domestic oil what is meant in this specification is a glyceride ester of fat-forming acid, such acids being preponderantly $C_{18}$ or higher. Such oils include soybean, cottonseed, corn, safflower, sunflower, lard, peanut and rapeseed, but do not include palm oil which responds distinctly differently from domestic oil for the instant purpose. The glyceride esters or oils recoverable here aslo include triglycerides, diglycerides and monoglycerides, the first being the commonest. The fat-forming acids here are mainly stearic, oleic, linoleic, linolenic; of lesser significance are erucic and arachidonic.

The temperature of treating the clay with the aqueous alkali should be at least about 40° C. and preferably 75°–95° C. at one atmosphere pressure for efficiency and economy. Where superatmospheric pressure clay washing is practiced, the temperature of the washing can go up correspondingly, e.g. to 200+°, so long as the washing mixture remains in liquid phase condition and so long as an appreciable amount of the oil of the glyceride esters on the clay can be collected as such from the first washing operation. Oily phases which are mainly glyceride esters, but can contain more or less free fatty acid, can be collected conventionally from aqueous phases by virture of their difference in density. The spent clays to be treated are crystalline, are often naturally or chemically treated to be acidic, and they include activated clays, montmorillonites, attapulgites, kaolinites, and the like.

Preferred alkali for the clay dispersing steps of this invention for cost and effectiveness is sodium hydroxide. Soda ash also is good. Potassium hydroxide also can be used, but it is much more expensive. Ammonium hydroxide and calcium hydroxide can be used where they do not interfere with the attaining of the desired pH, but often they are inadequate for getting high enough pH readily; this is true of other metal hydroxides and carbonates also. Double decomposition of an alkaline earth metal hydroxide, e.g. calcium hydroxide, with sodium sulfate is one way of generating some alkalinity for this processing while also providing soluble salt and adding a little gypsum to the clay sediment.

In order to accelerate separation of oily from aqueous phases, it is desirable to have the aqueous phase saline. In general chlorides are avoided for generating such salinity because of their corrosive nature to steel. Sodium sulfate is a preferred type of salinity because of its frequent availability from fatty acid springing operations, its less aggressive corrosiveness than chlorides towards ferrous metals.

Materials of construction for the present operation can be of many kinds. Preferably mild steel is used where possible, and, where pH is low, austenitic stainless steel is preferred. If necessary, an additional clay washing stage can be added to the process, but this usually is not needed.

As will be evident from the examples the use of spent clay from the bleaching of domestic oils is critical for the process. While there may be in certain situations a "pH window" for treating of clays used for bleaching lauric oils, it has been most elusive and we have not found one, and palmitic acid-rich oils such as palm oil respond quite differently than do domestic oils. The type of bleaching clay used makes some difference as certain clays hold more or less tightly onto their oily content. The temperature and time of dispersing also are effects which should be checked. Preferably the temperature is 85°-95° C. and the time can be as short as 15 minutes and preferably for at least ½ an hour and can extend to 3 hours or more. By far the most important element in this combination of treating conditions is the pH to maximize recovery of glyceride ester. Mixing conditions for clay washing seem best when they attain large fluid displacement with relatively modest shear (large diameter, fairly slow-moving turbines in baffled tanks, e.g. 60 RPM turbines).

As can be seen from the exemplary data, pH should be broadly between about 10.5 and 10.8 in the aqueous phase at the end of the washing and the most highly preferred pH is about 10.65. The pH, temperature, time and water dilution advantageously are optimized to maximize glyceride ester recovery from a particular spent clay feed whenever possible. To summarize, the clay dispersing is done with efficient agitation in a time of a few minutes to several hours, usually about ¼ of an hour and preferably about ½ an hour, at a temperature at least about 80° C. and preferably between about 85° and 95° C. using 2-6 parts by weight of water per part of spent clay feed and preferably about 4 parts of such water. Advantageously the water can be furnished by an aqueous solution containing preferably about 10-15% by weight sodium sulfate with enough sodium hydroxide to establish the final desired "pH window."

Partially cleansed and fully cleansed clay preferably is separated from aqueous phase by filtration, although sedimentation, settling, or other conventional ways can be used. Centrifugation is desirable using, of course, centrifuges equipped to handle large volumes of clay solids if such solids are present in an aqueous stream being so processed.

In this specification all temperatures are in degrees Centigrade, all percentages are weight percentages, and all parts are parts by weight unless otherwise expressly indicated. The following examples illustrate the discovery of the unexpected "pH window" for domestic oil recovery from spent bleaching clay, but should not be construed as limiting the invention.

EXAMPLES 1-6

A series of runs were made using spent bleaching clay from the refining of soybean oil (the clay when fresh being Filtrol 105, a product of Filtrol Corporation). The oil content of the starting spent clay was about 26% by weight. The spent clay had been collected as a filter cake, such cake having been steamed in the press before collection to displace some oil from it. In each Example 1-6 1200 grams of warm water diluent and 300 grams of the spent clay were heated to 95° C. in a 2000 ml. agitated flask, and 50% aqueous sodium hydroxide solution was added in small increments to attain the pH indicated in the table below. At such point mixing was continued for a half hour, then the heating and stirring was stopped. The thus-treated clay was separated cursorily from the liquids present by settlement and filtration, then such liquids were centrifuged to recover an oil that was mostly triglycerides.

| Example No. | Final pH | Approximate wt. % of oil recovery |
|---|---|---|
| 1 | 9.75 | 3.1 |
| 2 | 9.85 | 18.5 |
| 3 | 10.65 | 35.5 |
| 4 | 10.45 | 27.3 |
| 5 | 11.0 | 3.7 |
| 6 | 11.0 | 3.6 |

The drawing is a smooth curve plotted from the above exemplary data, the axis of ordinates being pH, the axis of abscissas being percentage of glyceride oil recovered as such (esters) relative to the oil content of the spent clay.

EXAMPLE 7

The oil recovered from Example 4 was analyzed. The result of the analysis were as follows:

| | |
|---|---|
| Weight percent clay in recovered oil | 4.93 |
| Free fatty acids - weight percent | 0.51 |
| Color, Lovibond | >27R>OY |
| Triglycerides - weight percent | 87.6 |
| Diglycerides - weight percent | 6.2 |
| Monoglycerides - weight percent | 4.0 |
| Polyols - weight percent | 2.1 |

| Free and combined fatty acids present, weight percent of fatty acids: | |
| --- | --- |
| $C_{12}$ | 0.1 |
| $C_{14}$ | 0.1 |
| $C_{15}$ | 0.1 |
| $C_{16}$ | 10.0 |
| $C_{17}$ | 0.1 |
| stearic | 3.7 |
| oleic | 20.2 |
| linoleic | 49.8 |
| linolenic | 7.0 |
| $C_{20}$ | 0.4 |
| Above fatty acids total: | 91.5 |
| Calculated Iodine Value: | 133.2 |

This oil and the oils recovered from the other exemplary runs can be recycled to a vegetable oil refining process with the fresh oil therefor.

EXAMPLE 8

Experiments were conducted using essentially the same procedure as that of Examples 1–6, except that the spent clay was from the refining of palm kernel oil, a lauric fat, and it contained 29.1% by weight oil. The clay itself was the same variety. In various runs pH was varied from 5.90 to 9.90; there was no supernatant triglyceride oil for recovery. Within the pH range of 9.7–9.9 a considerable amount of soap was formed. This could be acidulated to yield fatty acids. Below that pH range apparently very little oil if any would separate from the clay.

What is claimed is:

1. A process for treating crystalline clay that has been spent in the bleaching of domestic glyceride esters, said process comprising:

forming a dispersion of said spent clay and aqueous alkali, the temperature of said dispersion being at least about 80° C., the weight ratio of water to original spent clay in said dispersion being about 2–6:1, the pH of said dispersion being in the range of about 10.5–10.8 for removal of glyceride ester as such from said spent clay; and recovering resulting separated glyceride ester from said dispersion.

2. The process of claim 1 wherein the dispersion is agitated for at least about 30 minutes, the alkali used is caustic soda, and the temperature used is about 85°–95° C.

3. The process of claim 1 wherein the said spent clay is from the bleaching of mainly soybean oil, the weight ratio of water to original spent clay is about 4:1, and the pH is about 10.6–10.65.

4. The process of claim 1 wherein said aqueous dispersion is saline, and it contains about 10% to 17% by weight sodium sulfate.

* * * * *

UNITED STATES PATENT AND TRADEMARK OFFICE
CERTIFICATE OF CORRECTION

PATENT NO. : 4,110,356

DATED : August 29, 1978

INVENTOR(S) : Allan S. Hodgson; Jerry F. P. Red

It is certified that error appears in the above-identified patent and that said Letters Patent are hereby corrected as shown below:

Column 1, line 29, change "inflation" to --infestation--. Column 2, line 60, change "aslo" to --also--. Column 4, line 60, change "result" to --results--.

Signed and Sealed this

Twentieth Day of March 1979

[SEAL]

Attest:

RUTH C. MASON
*Attesting Officer*

DONALD W. BANNER
*Commissioner of Patents and Trademarks*